(12) United States Patent
Law (10) Patent No.: US 10,785,293 B2
(45) Date of Patent: Sep. 22, 2020

(54) CONTENT DELIVERY TO PHYSICALLY-PROXIMATE DEVICES USING A MESH-ASSISTED CACHE

(71) Applicant: Akamai Technologies, Inc., Cambridge, MA (US)

(72) Inventor: William R. Law, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 250 days.

(21) Appl. No.: 14/938,445

(22) Filed: Nov. 11, 2015

(65) Prior Publication Data
US 2016/0134691 A1    May 12, 2016

Related U.S. Application Data

(60) Provisional application No. 62/078,264, filed on Nov. 11, 2014.

(51) Int. Cl.
| | |
|---|---|
| *H04L 29/08* | (2006.01) |
| *H04W 4/70* | (2018.01) |
| *H04L 12/28* | (2006.01) |

(52) U.S. Cl.
CPC ........ *H04L 67/104* (2013.01); *H04L 12/2838* (2013.01); *H04L 67/1061* (2013.01);
(Continued)

(58) Field of Classification Search
CPC ............... H04L 67/104; H04L 67/1046; H04L 67/1048; H04L 67/2842; H04L 67/2847;
(Continued)

(56) References Cited

U.S. PATENT DOCUMENTS

| | | |
|---|---|---|
| 7,111,057 B1 | 9/2006 | Sherman et al. |
| 7,376,716 B2 | 5/2008 | Dilley et al. |

(Continued)

FOREIGN PATENT DOCUMENTS

WO    2011028954 A1    3/2011

OTHER PUBLICATIONS

EPC Application 15859601.5, Extended European Search Report dated Apr. 26, 2018, 13 pages.
(Continued)

*Primary Examiner* — Khoa Huynh
(74) *Attorney, Agent, or Firm* — David H. Judson (57) ABSTRACT

A plurality of WiFi-enabled devices that are physically proximate to one another form an ad hoc mesh network, which is associated with an overlay network, such as a content delivery network. A typical WiFi device is a WiFi router that comprises addressable data storage, together with control software operative to configure the device seamlessly into the WiFi mesh network formed by the device and one or more physically-proximate devices. The addressable data storage across multiple such devices comprises a distributed or "mesh-assisted" cache that is managed by the overly network. The WiFi mesh network thus provides bandwidth that is leveraged by the overlay network to provide distribution of content, e.g., content that has been off-loaded for delivery (by content providers) to the CDN. Other devices that may be leveraged include set-top boxes and IPTV devices.

20 Claims, 4 Drawing Sheets

(52) U.S. Cl.
CPC ...... *H04L 67/1091* (2013.01); *H04L 67/1097* (2013.01); *H04L 67/2842* (2013.01); *H04W 4/70* (2018.02)

(58) Field of Classification Search
CPC ............. H04L 67/2857; H04L 12/2838; H04L 67/1061; H04L 67/1091; H04L 67/1097; H04W 4/70
See application file for complete search history.

(56) References Cited

U.S. PATENT DOCUMENTS

| | | | |
|---|---|---|---|
| 7,472,178 | B2 | 12/2008 | Lisiecki et al. |
| 7,581,158 | B2 | 8/2009 | Alstrup et al. |
| 8,078,946 | B2 | 12/2011 | Alstrup et al. |
| 8,194,438 | B2 | 6/2012 | Ahn et al. |
| 8,332,484 | B2 | 12/2012 | Afergan et al. |
| 8,477,837 | B2 | 7/2013 | Yagasaki et al. |
| 9,602,614 | B1* | 3/2017 | Shankaran ............ G06F 15/177 |
| 2004/0093419 | A1 | 5/2004 | Weihl et al. |
| 2007/0061433 | A1 | 3/2007 | Reynolds et al. |
| 2007/0280165 | A1 | 12/2007 | Doshi et al. |
| 2008/0109853 | A1* | 5/2008 | Einarsson .......... H04N 7/17318 725/62 |
| 2009/0215411 | A1 | 8/2009 | Tucker et al. |
| 2010/0153989 | A1 | 6/2010 | Jing et al. |
| 2011/0225312 | A1* | 9/2011 | Liu ........................ H04L 12/18 709/231 |
| 2012/0096106 | A1 | 4/2012 | Blumofe et al. |
| 2012/0198075 | A1* | 8/2012 | Crowe ................ H04L 67/2847 709/226 |
| 2013/0107792 | A1 | 5/2013 | Lam |

OTHER PUBLICATIONS

PCT/US2015/060146 Search Report and Written Opinion, dated Feb. 22, 2016, 13 pages.

Zhu, Challenges and Opportunities in Supporting Video Streaming over Infrastructure Wireless Mesh Networks, Multimedia and Expo, 2009, ICME 2009. IEEE Jun. 20, 2009, pp. 1548-1549, IEEE 2009, 2 pages.

Zhu, Supporting Video Streaming Services in Infrastructure Wireless Mesh Networks: Architecture and Protocols. IEEE International Conference CN Communications. 2008: ICC 2008, May 19-23, 2008. pp. 1850-1855, proceedings, 6 pages.

* cited by examiner

CONTENT DELIVERY TO PHYSICALLY-PROXIMATE DEVICES USING A MESH-ASSISTED CACHE

BACKGROUND

Technical Field

This application relates generally to overlay networking and, in particular, to techniques to facilitate content delivery over a mesh-assisted cache in association with an overlay network, such as a content delivery network.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

It is known to extend a CDN to interoperate with a peer-to-peer (P2P) network. One such hybrid solution is described in U.S. Pat. No. 8,332,484. In this approach, the content delivery network includes a mapping system for directing requests to CDN servers. One or more peer machines become associated with the CDN, and the CDN mapping system is then used to enable a given peer to locate another peer in the P2P network, and/or a CDN server. Using this hybrid approach, CDN customer content may be delivered from the CDN edge network, from the P2P network, or from both networks. In one embodiment, customer content is uploaded to the CDN and stored in the edge network, or in a storage network associated therewith. The CDN edge network is then used to prime the P2P network, which may be used to take over some of the content delivery requirements for the customer content. The decision of whether to use edge network or peer network resources for delivery may be based on load and traffic conditions.

P2P delivery, however, is not without its difficulties. Current P2P solutions use the same uplink and downlink channels of the device to deliver content to peers. This can place the P2P system into direct (congestion and financial) conflict with provisioned Internet service otherwise used by the device. In particular, known P2P implementations utilize the uplink of an existing Internet Service Provider (ISP) to distribute data to peers. This causes congestion on the uplink, or at an uplink aggregation point, such as a DSLAM or CMTS, which in turns lowers both the peering throughout and the general non-peering throughput of the end-user. The ISP is not compensated for the P2P traffic running over its network and thus has a financial incentive to restrict or block P2P activity. The end-user pays for upload bandwidth (especially under cellular connectivity), which standard P2P schemes take advantage of without providing any compensation to the end-user. This causes many end-users to disable P2P schemes on their devices. Further, it is also known that Internet access is typically asymmetrical, with the uplink rate being many times smaller than the downlink rate. This hinders the P2P distribution of video content, which is often downloaded at a higher rate than it can be shared with peers. Moreover, P2P solutions typically cannot span ISPs, as the ISP must pay for traffic that transits or egresses their network. This lowers the efficiency of P2P schemes in neighborhoods where there are competing ISPs servicing physically proximate users.

BRIEF SUMMARY

An out-of-band communication channel, such as WiFi, is utilized to enable establishment of a mesh network among physically proximate nodes that are also concurrently connected to a primary Internet connection. In this approach, this mesh network, in conjunction with accessible storage on each node, is used to establish a distributed cache. In the context of this disclosure, this distributed cache sometimes is referred to as a "mesh-assisted" cache. Preferably, this mesh-assisted cache is seeded and managed by an overlay network, such as a content delivery network ("CDN"). In particular, the mesh-assisted cache is used to offload traffic that the overlay network nodes would otherwise have need to source, either from their local cache, or their primary Internet connection. By spreading the cache across the nodes of the mesh network, the cache footprint is larger and the offload ratio higher that it would be if each node acts independently.

According to a more specific aspect of this disclosure, a plurality of WiFi-enabled devices that are physically proximate to one another form an ad hoc "WiFi mesh network," which in turn is then associated with an overlay network, such as a content delivery network or "CDN." A typical WiFi device is a WiFi router that comprises addressable data storage, together with control software operative to configure the device seamlessly into the WiFi mesh network formed by the device and one or more physically-proximate devices. To this end, the addressable data storage across multiple such devices comprises a distributed ("mesh-assisted") cache that is managed by the overly network. The WiFi mesh network thus provides bandwidth that is leveraged by the overlay network to provide distribution of content, e.g., content that has been off-loaded for delivery (by content providers) to the CDN. In one embodiment, the content is distributed in a traditional unicast client-server scheme. In a second embodiment, the content is distributed in part as peer-to-peer (P2P) traffic.

The use of WiFi routers to physically host the mesh network is not mandatory. Any device with persistent power, connectivity to the general Internet, and the ability to establish WiFi connections thus is a candidate to participate as a mesh network node. Other types of devices that may be leveraged in a similar manner include set-top boxes, smart TVs, home gateway devices, and the like.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which.

DETAILED DESCRIPTION

Figure 1:
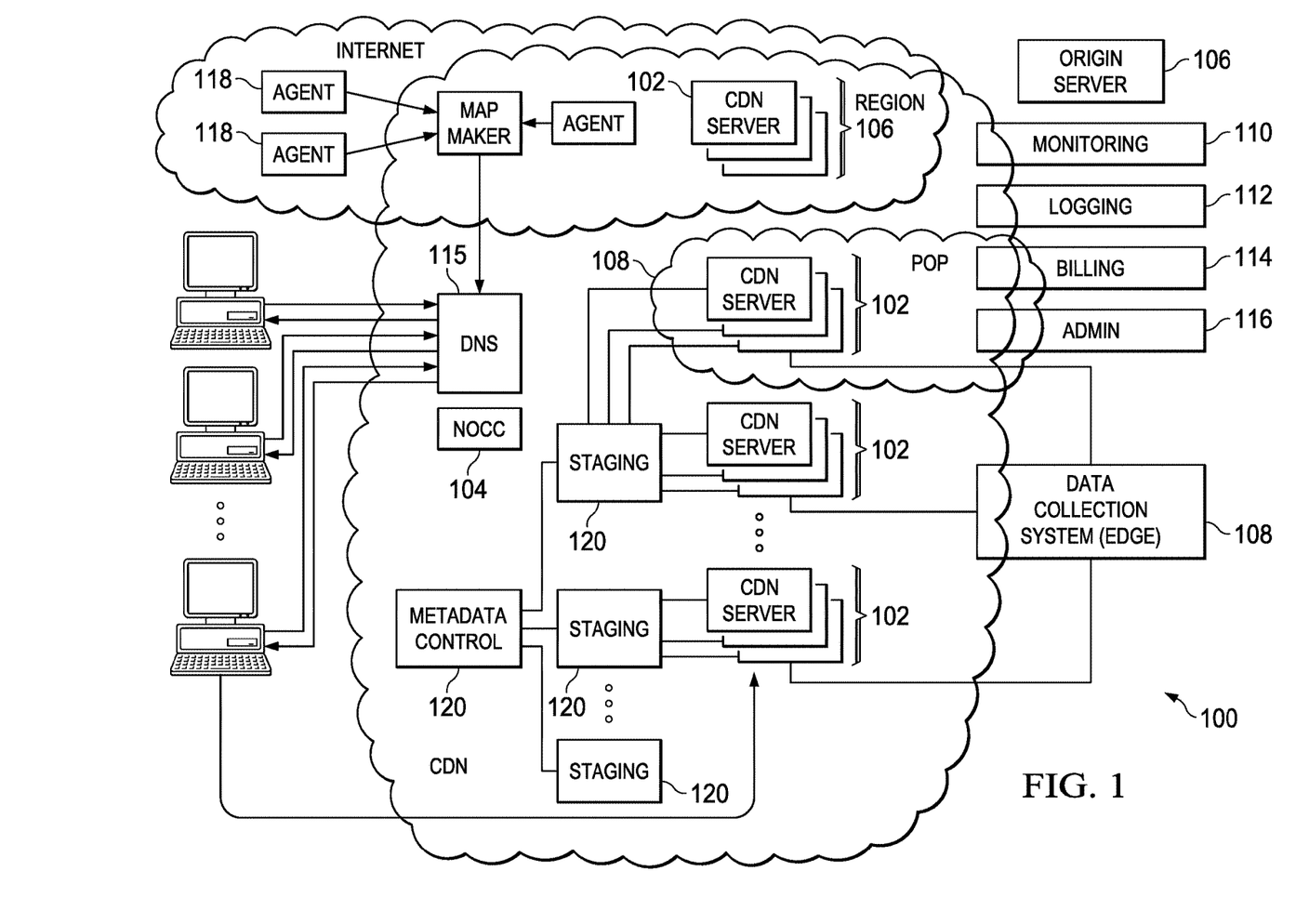
FIG. 1 is a block diagram illustrating a known distributed computer system configured as a content delivery network (CDN)

FIG. 1 illustrates a known distributed computer system that (as described below) is extended by the mesh-assisted cache delivery techniques herein.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
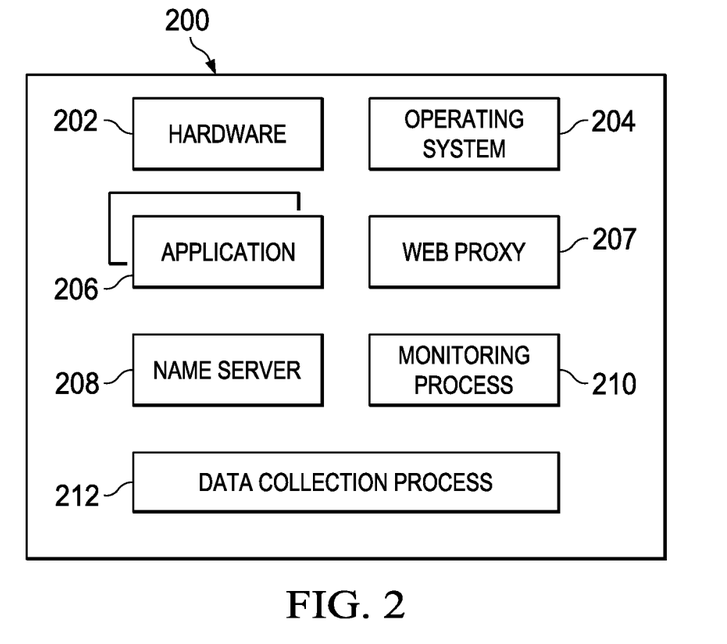
FIG. 2 is a representative CDN edge machine configuration.

As illustrated in FIG. 2, a given machine 200 comprises commodity hardware 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

As additional background, a content delivery network of the type described above may be extended into one or more mobile or wireline networks that cannot or do not otherwise support fully-managed CDN edge servers. In this approach, which is described in U.S. Publication No. 2012/096106, an "extender" box is deployed in the mobile or wireline network, preferably as a passive web caching proxy that is beyond the edge of the CDN but that serves CDN-provisioned content under the control of the CDN. The extender may also be used to transparently cache and serve non-CDN content. An information channel is established between the extender and the CDN to facilitate the extender functionality. The extender caches and serves the CDN customer content based on information it receives, in terms of content and cache-control instructions, from the CDN edge servers. Thus, in effect, the CDN (and, in particular, an edge server) acts as the "origin" server for the extenders. Each time an extender receives a request for a CDN customer's content (as determined by a DNS lookup), the extender goes forward to a CDN server (one of the IPs returned by the DNS lookup) to either fetch the content or, if the content is already in cache, to validate it (preferably, by IMS).

Finally, the CDN also may support multicast-enabled peer-to-peer streaming delivery using a method such as described in U.S. Pat. No. 7,581,158, or U.S. Pat. No. 8,078,946. These patents describe delivery of data by, e.g., receiving a plurality of peer-to-peer delivered loss-resilient code representations of the data, receiving a plurality of multicast-delivered loss-resilient code representations of the data, an re-generating the data by decoding a combination of the plurality of peer-to-peer delivered loss-resilient code representations and the plurality of multicast delivered loss-resilient code representations.

Content Delivery Offload Via a Router-Based Mesh-Assisted Cache

With the above as background, the technique of this disclosure is now described.

As is well-known, home networks typically deploy WiFi routers, often provisioned by a service provider. The operational radius of these routers overlaps residences. A home consumer, in accessing his or her WiFi hotspot, can view the SSID (the network name) of multiple other routers, both in a suburban street and especially in city areas, where often a plurality (e.g., ten or more) such devices can typically be accessed. These routers have radios both to receive and transmit data. A notion that the subject disclosure exploits is that data transferred between router peers is available at zero additional cost to consumer, ISP or CDN. In particular, the consumer has already paid for the router and the electricity it is consuming. The traffic is not touching the ISP's network.

According to this disclosure, the large amount of bandwidth available between and among these routers is tapped for content distribution. Preferably, the traffic does not flow up and/or down the operator's pipes; rather, the traffic in effect moves "sideways" over WiFi spectrum between physically-adjacent router peers.

Figure 3:
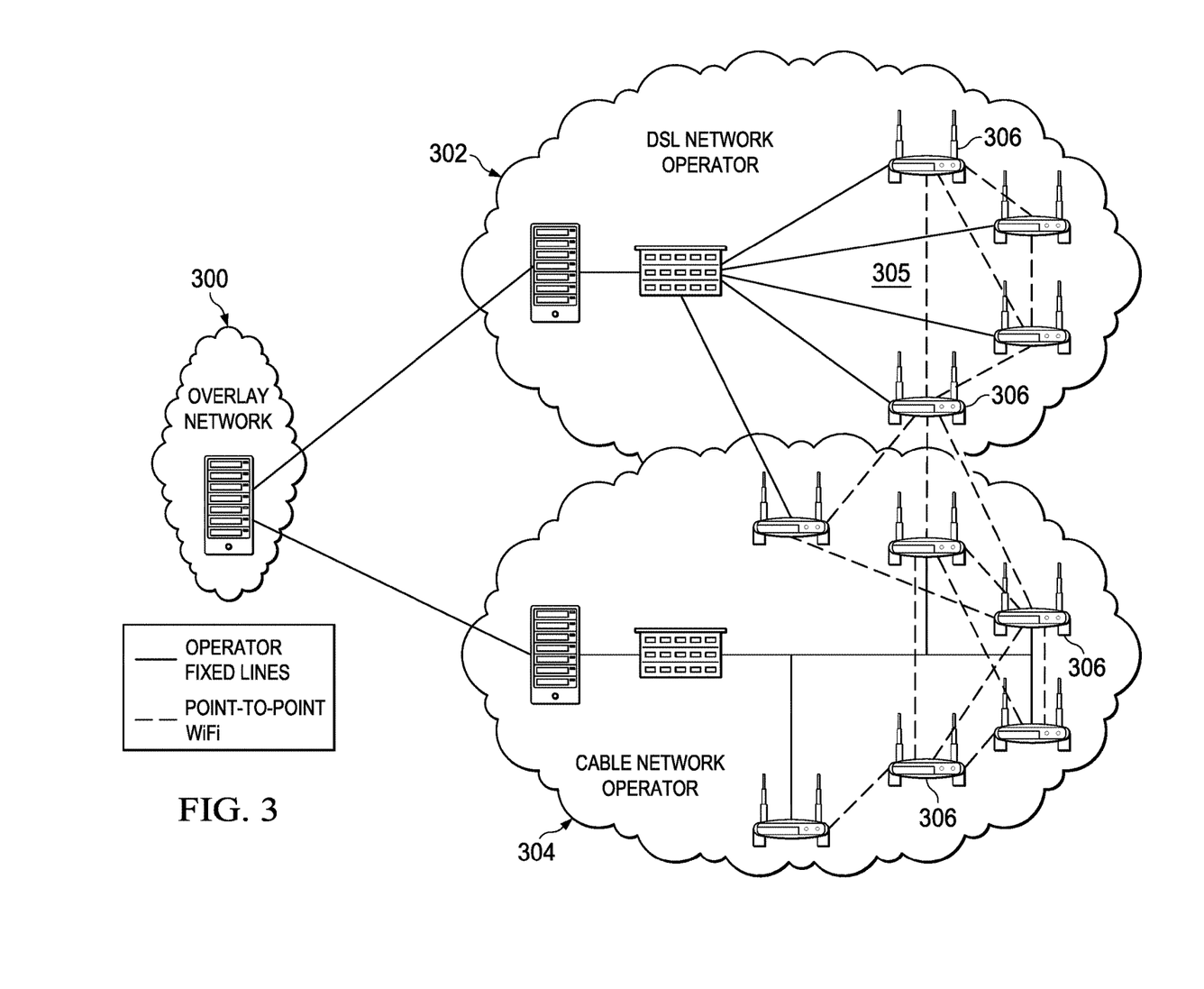
FIG. 3 illustrates the router-based mesh-assisted cache delivery architecture of this disclosure.

FIG. 3 illustrates a representative embodiment of the technique of this disclosure. In this scenario, the CDN is represented as overlay network 300. A representative overlay network is shown in FIG. 1. In this example, there are also two (2) operator networks: a DSL network 302, and a cable network 304. The DSL network has a network operator, as does the cable network. The number and type of networks (such as networks 302 and 304) are merely exemplary, as any number of such networks may support the infrastructure of this disclosure.

Each network 302 and 304 is presumed to have a number of routers 306. Typically, the routers are associated with an individual subscriber's home network, although this is not a limitation. Typically, a router 306 is a WiFi router, which may be provisioned by the end user, by the end user's service provider (e.g., the network operator), or some other entity. The operational radius of each router typically extends beyond the physical area surrounding an end user's residence, and typically these radii overlap residences. A home consumer, in accessing his or her WiFi hotspot, is presumed to be able to view the SSIDs of multiple other nearly routers, both in a suburban street and especially in city areas, where numerous of such devices can typically be accessed. As is well-known, these routers have radios both to receive and to transmit data.

As also illustrated in FIG. 3, an operator network (such as network 302) typically has a number of fixed lines, shown in solid. In addition, and due to the overlap in WiFi coverage, typically the WiFi routers within proximity to one another provide for point-to-point WiFi connections, shown in broken lines. Collectively, the WiFi connections comprise a wireless mesh network 305 or "ad hoc" network. Such a communications network comprises the radio nodes in the various routers organized in a "mesh" topology. The coverage area of the radio nodes working as a single network will depend on the number of routers, their locations, and their connectivity to one another. When a particular node no longer operates or is not reachable, the remainder rest of the nodes can still communicate with each other, directly or through one or more intermediary nodes. Ad hoc networks of this type can be implemented with various wireless technology including 802.11, 802.15, 802.16, cellular technologies or combinations of more than one type. While WiFi is the preferred intra-node communication protocol, this is not a limitation.

According to this disclosure, each router that will participate in the mesh network 305 includes additional storage (e.g., a 32-64 GB Flash-based data store), a mechanism to establish multiple simultaneous point-to-point connections with other similarly-configured routers, and control software provided by the overlay network service provider. Preferably, the additional storage is accessible to the overlay network and, as a consequence, it may be used as part of a larger, distributed cache (that comprises addressable storage aggregated from other routers in the mesh). The mesh network, in conjunction with the accessible storage on each router, establish the "mesh-assisted" cache of this disclosure.

It is not required that a router be provisioned with additional storage for the mesh-assisted cache support, as existing storage in the router may be used for this purpose.

Preferably, the control software has the capability of interacting with standard CDN mapping and edge server functionality to facilitate the connection of the mesh network to the CDN. Further, to facilitate delivery and storage of content over the mesh network, as noted above the additional storage in each router (or at least some portion thereof) is addressable by the CDN. Collectively, the storage acts as a distributed cache that is seeded and managed by the overlay network service provider (as part of, or an adjunct to, the conventional CDN). Thus, preferably the wireless mesh network 305 is managed and operated by the overlay network provider, perhaps in combination with the one or more network providers. The mesh preferably is established transparently between compatible routers that have been provisioned to include the additional storage, connection mechanism, and control software layer. End users do not need to configure the mesh and, indeed, they do not even need to know of its existence or operation, as the mesh-assisted cache does not interfere with existing operations in the individual home networks.

According to the disclosure, given traffic (e.g., both unicast and P2P traffic) is carried over the wireless mesh network. As noted, the mesh network 305 in associated with the local storage (aggregated across the network) acts as the distributed, mesh-assisted cache for the CDN, as noted, thereby minimizing the traffic moving over the operator's network.

Figure 4:
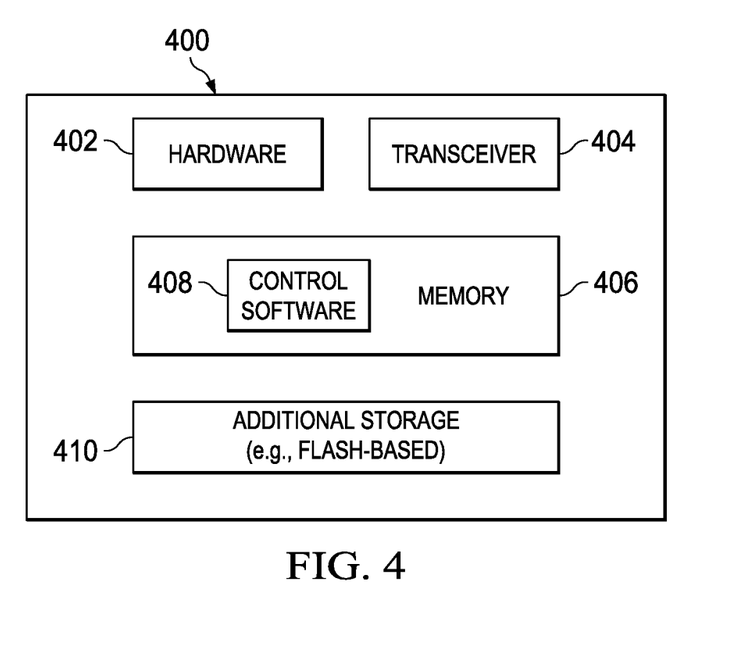
FIG. 4 depicts a representative WiFi router that is configured to provide the functionality of this disclosure.

FIG. 4 depict a representative WiFi router 400 that is configured to provide the functionality described above. Among other components, the router 400 comprises hardware 402 (e.g., a processor), and a wireless transceiver 404 that provides for communicating wirelessly to and from the device. The transceiver 404 may comprise separate transmitter and receiver components. A computer memory 406 stores computer programs, such as router control software 408, whose operation is described in more detail below. Preferably, the router also includes additional storage 410 (e.g., which may be Flash-based) to facilitate the router becoming part of the mesh-assisted cache in the manner described above. The additional data store 410 typically is on-board as depicted, but it may also be external storage that is associated with some other device or system.

The following describes a workflow for the router control software 408 operative on a particular router (or, more generally, a "device" that is configured to provide the function). As depicted in FIG. 4, the control software 408 is maintained in computer memory 406 (or other data storage) and executes in a hardware processor 402 of the device.

Workflow
Upon power-up, a device checks a network configuration file (e.g., available in the CDN from web proxy 207 or some other component) to see if it should enable the mesh network functionality. Preferably, the device continues to poll this configuration file during operation to provide a mechanism for the CDN to disable or modify the service on that particular device as necessary or desirable.

Using a local (to the device) point-to-point connection mechanism, the device discovers other such devices (e.g., routers) and enters the ad-hoc mesh network. Preferably, the device maintains a minimum threshold of signal strength (that is configurable), so that it is not constantly making marginal connections to distant devices.

Once configured into the ad hoc mesh network, the device preferably maintains an in-memory map of the content objects it holds in its local data store so that is can quickly resolve requests for content that are received by the device. Preferably, the local addressable storage implements configurable cache eviction and revocation rules that are managed by the CDN.

Traffic flowing through the device is visible to the control software and is acted upon as necessary or desired to facilitate the content delivery. For example, hostnames associated with content requests are filtered by hostname to determine whether content associated with that hostname is available to be delivered by the ad hoc wireless network and, if so, what content handling policy (if any) to apply to any request. Preferably, the device always attempts to source the requested content from the mesh-assisted cache. Preferably, the device maintains a service level (e.g., enforced by a configurable SLA) on content retrieval, fulfilling requests from the CDN edge if it cannot locate the content on the mesh or if the nodes are too slow to respond or transfer. The technique described in U.S. Publication No. 2012/0096106, which is incorporated herein by reference, may be used for this process.

The overlay network at its discretion may choose to push content to certain devices. It can do this as part of a standard pre-delivery schema, for example, in advance of a large and popular software update.

The approach has numerous benefits. As noted, the approach herein utilizes an out-of-band communication channel (e.g., WiFi) to enable communication among physically-proximate nodes that are also concurrently connected to a primary Internet connection (namely, the overlay). These nodes assemble themselves into a mesh network over which they build a distributed cache. The majority of the content being requested by the consumer devices then can be sourced from within the distributed cache. Preferably, minimal traffic moves over the operator's fixed line network. Because the approach does not use the network operator's connectivity per se for the content delivery, or to upload content for P2P distribution, it therefore does not cause congestion. Preferably, content is only downloaded via the edge network and then the ISP, but it is not uploaded. Because traffic is not moving over the ISP's fixed line network, the ISP has no incentive to restrict or block it (as they might otherwise). Indeed, the approach describes results in less data transiting an ISP network, and the ISP may then have a financial incentive to encourage the delivery approach. Further, and because the consumer is powering his or her home router anyway, there is zero added cost to the end-user, as the wireless mesh network does not interfere with the home network operation. The bandwidth cap that the end user pays for (with the ISP) is not used for peer distribution. Because the approach results in less data transiting the ISP connection, the ISP also has a financial incentive in allowing it. The approach works well because the WiFi peer links are symmetrical in throughput and well-suited to moving large files between peers, including video files. Indeed, in this approach the peer bandwidth may even exceed the download rate available via the ISP.

Another advantage is that physically proximate routers can participate in the mesh, even if they are fed by disparate ISPs. Thus, as shown in FIG. 3, routers belonging to different network operators (such as DSL and cable providers shown in FIG. 3) can choose to cooperate in the distribution of content over ad hoc wireless mesh network. This cross-pollination leads to higher availability of peers and a larger accessible content pool and is thus mutually beneficial.

As shown in FIG. 3, the "home network" is not limited to having just a fixed line connection. The home network may be connected to the general Internet via a cellular provider, or a space-based provider.

Although the embodiment has described the subject matter in the context of a router, this is not a limitation. Hardware does not need to be limited to routers, although these are the most numerous and convenient hardware platforms at first. Adding the above-described WiFi capability to Set Top Boxes (STB)s would also allow them participate in the mesh. Additionally small form factor devices similar to Roku™, AppleTV™, etc., also could join with the appropriate WiFi enhancements described.

A given mesh-assisted cache may comprise different types of such devices. The devices that comprise a given mesh-assisted cache may also change over time.

In addition, while the distribution scheme has been described with respect to unicast traffic, this is not a limitation, as the scheme can be leveraged for any store-and-forward, pre-positioning or peer-to-peer distribution architectures.

The technique described herein takes advantage of and accesses (for content distribution) bandwidth from physically-proximate WiFi devices that has not been previously used for this purpose.

The router control software may be delivered to a router device by the CDN, or that software may be provided natively on the device.

As noted above, the router control software may operate over an overlay network "extender" type protocol such as described in U.S. Publication No. 20120096106, the disclosure of which is incorporated herein.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the device-side or server-side of the connection. Any computing entity (system, machine, device, program, process, utility, or the like) may act as the client or the server.

The invention claimed is:

1. A device adapted to be located in a home network and connected to an operator network over which the device receives network content, the device comprising:
   a hardware processor;
   data storage; and
   computer memory holding computer program instructions, wherein the hardware processor executes the computer program instructions to:
      communicate with an edge device associated with an overlay network, the overlay network being distinct from the operator network, to determine whether the device supports mesh-assisted cache delivery of overlay network content objects, the overlay network content objects being distinct from the network content;
      when the device supports mesh-assisted cache delivery of overlay network content objects, to establish, wirelessly, a point-to-point connection to one or more other similar devices that are physically proximate to the home network as determined at least in part by a minimum threshold of signal strength configured at the device, wherein the point-to-point connections so established comprise a wireless mesh network;
      enable access to the data storage by the overlay network via the wireless mesh network, wherein the data storage in the device in association with data storage in other devices in the wireless mesh network comprise a mesh-assisted cache; and
      participate in delivery of the overlay network content objects via the wireless mesh network and the mesh-assisted cache, wherein participating in delivery includes maintaining an in-memory map of the content objects available in the data storage and implementing one or more overlay network-managed cache eviction and revocation rules for the data storage;
      wherein upon establishing the point-to-point connection to one or more other similar devices, the device continually polls the overlay network to obtain a configuration for the device with respect to the wireless mesh network as determined by the overlay network.

2. The device as described in claim 1 wherein the delivery of the overlay network content objects is one of: content distribution by unicast, store-and-forward content distribution, content pre-positioning, and peer-to-peer (P2P) content distribution.

3. The device as described in claim 1 wherein the overlay network content objects are sourced from the overlay network.

4. The device as described in claim 1 wherein the data storage is Flash-based memory.

5. The device as described in claim 1 being one of: a WiFi router, a set-top box (STB), a smart TV device, a home gateway device, and any other device that connects to the Internet and includes a wireless transceiver.

6. The device as described in claim 1 wherein the wireless mesh network uses WiFi as an intra-node communication protocol.

7. The device is described in claim 1 wireless mesh network provides bandwidth for delivery of a majority of the overlay network content objects required by the device and the other devices that comprise the mesh-assisted cache.

8. The device as described in claim 1 wherein the computer program instructions respond to changes in the point-to-point connections to adjust a configuration of the mesh-assisted cache.

9. A method of content delivery, comprising:
associating physically-proximate wireless devices into a mesh network, wherein the wireless devices are considered physically-proximate as determined at least in part by a minimum threshold of signal strength configured at one of the wireless devices;
associating addressable data storage at each of the physically-proximate wireless devices of the mesh network into a mesh-assisted cache;
populating the mesh-assisted cache with content objects sourced from an overlay network; and
delivering the content objects sourced from the overlay network from the mesh-assisted cache using the mesh network, wherein delivering the content objects includes maintaining at each wireless device an in-memory map of the content objects available in its addressable data storage and implementing one or more overlay network-managed cache eviction and revocation rules for the addressable data storage;
wherein upon associating a particular physically-proximate wireless device into the mesh network, the particular physically-proximate wireless device continually polls the overlay network to obtain a configuration for the particular physically-proximate wireless device with respect to the mesh network as determined by the overlay network.

10. The method as described in claim 9 wherein the content objects sourced from the overlay network is delivered by one of: content distribution by unicast, store-and-forward content distribution, content pre-positioning, and peer-to-peer (P2P) content distribution.

11. The method as described in claim 9 wherein the wireless devices are WiFi routers.

12. The method as described in claim 9 wherein at least one of the wireless devices is one of: a WiFi router, a set-top box (STB), a smart TV device, a home gateway device, and any other device that connects to the Internet and includes a wireless transceiver.

13. The method as described in claim 9 wherein the mesh network provides bandwidth for delivery of a majority of the content objects sourced from the overlay network and required by the physically-proximate wireless devices.

14. The method as described in claim 9 wherein at least one wireless device of the mesh network is located physically in a home network, the home network being connected to an operator network over which the wireless device receives network content, the network content being distinct from the content objects sourced from the overlay network.

15. The method as described in claim 14 wherein the operator network is one of: DSLAM, and CMTS.

16. The method as described in claim 9 wherein associating physically-proximate wireless devices includes establishing a point-to-point communication from a first WiFi device to a second WiFi device, wherein the first and second WiFi devices are located in different home networks.

17. The method as described in claim 9 wherein the mesh network is established without notifying a user of at least one of the wireless devices.

18. The method as described in claim 9 wherein links across the mesh network are symmetrical in throughput.

19. A system for content delivery, comprising:
an overlay network edge device;
a wireless device connected to an operator network that is distinct from the overlay network, the wireless device including a hardware processor and comprising:
data storage addressable by the overlay network edge device; and
computer memory holding computer program instructions, wherein the hardware processor executes the computer program instructions to:
establish, wirelessly, a point-to-point connection to one or more other wireless devices that are physically proximate to the wireless device as determined at least in part by a minimum threshold of signal strength configured at the wireless device, wherein the point-to-point connections so established comprise a wireless mesh network;
enable access to the data storage by the overlay network via the wireless mesh network, wherein the data storage in the wireless device in association with data storage in the one or more other devices in the wireless mesh network comprise a mesh-assisted cache; and
participate in delivery of content objects sourced from the overlay network via the wireless mesh network and the mesh-assisted cache, wherein participating in delivery includes maintaining an in-memory map of the content objects available in the data storage and implementing one or more overlay network-managed cache eviction and revocation rules for the data storage at the wireless device;
wherein upon establishing the point-to-point connection to one or more other wireless devices, the wireless device continually polls the overlay network to obtain a configuration for the wireless device with respect to the mesh network as determined by the overlay network.

20. The system as described in claim 19 wherein the delivery of the content objects sourced from the overlay network is one of: content distribution by unicast, store-and-forward content distribution, content pre-positioning, and peer-to-peer (P2P) content distribution.

* * * * *